(12) United States Patent
Barré-Brisebois

(10) Patent No.: US 11,620,786 B2
(45) Date of Patent: *Apr. 4, 2023

(54) SYSTEMS AND METHODS FOR TEXTURE-SPACE RAY TRACING OF TRANSPARENT AND TRANSLUCENT OBJECTS

(71) Applicant: Electronic Arts Inc., Redwood City, CA (US)

(72) Inventor: Colin Barré-Brisebois, Stockholm (SE)

(73) Assignee: Electronic Arts Inc., Redwood City, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 17/194,052

(22) Filed: Mar. 5, 2021

(65) Prior Publication Data

US 2021/0201561 A1 Jul. 1, 2021

Related U.S. Application Data

(63) Continuation of application No. 16/282,117, filed on Feb. 21, 2019, now Pat. No. 10,970,913.

(51) Int. Cl.
G06T 15/06 (2011.01)
(52) U.S. Cl.
CPC .................... *G06T 15/06* (2013.01)
(58) Field of Classification Search
CPC ..................................................... G06T 15/06
See application file for complete search history.

(56) References Cited

U.S. PATENT DOCUMENTS

2009/0109220 A1 4/2009 Tomson et al.
2009/0219287 A1 9/2009 Wang et al.
(Continued)

OTHER PUBLICATIONS

G. Francois, S. Pattanaik, K. Bouatouch and G. Breton, "Subsurface Texture Mapping," IEEE Computer Graphics and Applications, vol. 28, No. 1, Jan./Feb. 2008, p. 34-42. (Year: 2008).*

(Continued)

*Primary Examiner* — Sing-Wai Wu
(74) *Attorney, Agent, or Firm* — Leydig, Voit & Mayer, Ltd.

(57) ABSTRACT

Disclosed is a hybrid approach to rendering transparent or translucent objects, which combines object-space ray tracing with texture-space parametrization and integration. Transparent or translucent objects are first parameterized using two textures: (1) a texture that stores the surface normal at each location on the transparent or translucent object, and (2) a texture that stores the world space coordinates at each location on the transparent or translucent object. Ray tracing can then be used to streamline and unify the computation of light transport inside thick mediums, such as transparent or translucent objects, with the rest of the scene. For each valid (e.g., visible) location on the surface of a transparent or translucent object, the disclosed embodiments trace one or more rays through such objects and compute the resulting lighting in an order-independent fashion. The results are stored in a texture, which is then applied during the final lighting stage.

20 Claims, 17 Drawing Sheets

(56) References Cited

U.S. PATENT DOCUMENTS

2016/0267720 A1    9/2016   Mandella et al.
2018/0033191 A1    2/2018   Mendez et al.

OTHER PUBLICATIONS

U.S. Appl. No. 16/282,117, filed Feb. 21, 2019, Pending.
Akenine-Möller et al. "Real-Time Rendering," 4th ed., Ch. 26: Real-Time Ray Tracing, A K Peters/CRC Press (Nov. 5, 2018).
Andersson et al. "DirectX: Evolving Microsoft's Graphics Platform," Game Developers Conference, San Francisco, CA (Mar. 19-23, 2018).
Andersson et al. "Shiny Pixels and Beyond: Real-Time Raytracing at SEED," Game Developers Conference, San Francisco, CA (Mar. 19-23, 2018).
Barré-Brisebois et al. "Approximating Translucency for a Fast, Cheap and Convincing Subsurface Scattering Look," Game Developers Conference, San Francisco, CA (Feb. 28-Mar. 4, 2011).
Barré-Brisebois et al. "PICA PICA and NVIDIA Turing," ACM SIGGRAPH 2018, (Aug. 12-16, 2018).
King et al. "BSSRDF Importance Sampling," ACM SIGGRAPH, Talks (2013).
McGuire et al. "Phenomenological Transparency," IEEE Transactions on Visualization and Computer Graphics, vol. 23, No. 5, pp. 1465-1478 (2017).
Pharr et al. "Physically Based Rendering: From Theory to Implementation," 3rd Ed., Ch. 2.5: Rays, Morgan Kaufmann Publishing (Nov. 25, 2016).
Pharr et al. "Physically Based Rendering: From Theory to Implementation," 3rd Ed., Ch. 8.1: Basic Interface, Morgan Kaufmann Publishing (Nov. 25, 2016).
Pharr et al. "Physically Based Rendering: From Theory to Implementation," 3rd Ed., Ch. 8.2: Specular Reflection and Transmission, Morgan Kaufmann Publishing (Nov. 25, 2016).
Pharr et al. "Physically Based Rendering: From Theory to Implementation," 3rd Ed., Ch. 8.5: Fresnel Incidence Effects, Morgan Kaufmann Publishing (Nov. 25, 2016).
Pharr et al. "Physically Based Rendering: From Theory to Implementation," 3rd Ed., Ch. 12.3: Point Lights, Morgan Kaufmann Publishing (Nov. 25, 2016).
Pharr et al. "Physically Based Rendering: From Theory to Implementation," 3rd Ed., Ch. 12.5: Area Lights, Morgan Kaufmann Publishing (Nov. 25, 2016).
Pharr et al. "Physically Based Rendering: From Theory to Implementation," 3rd Ed., Ch. 13: Monte Carlo Integration, Morgan Kaufmann Publishing (Nov. 25, 2016).
Pharr et al. "Physically Based Rendering: From Theory to Implementation," 3rd Ed., Ch. 14.1: Sampling Reflection Functions Morgan Kaufmann Publishing (Nov. 25, 2016).
Zucconi, Alan. "Fast Subsurface Scattering," Part 1, Aug. 30, 2017; https://www.alanzucconi.com/2017/08/30/fast-subsurface-scattering-1/(2017).
Zucconi, Alan. "Fast Subsurface Scattering," Part 2, Aug. 30, 2017; https://www.alanzucconi.com/2017/08/30/fast-subsurface-scattering-2/(2017).
R.W. Fleming, H.W. Jensen and H. H. Bulthoff, "Perceiving translucent materials," 2004, Proceedings of APGV2004: ACM SIGGRAPH Symposium on Applied Perception in Graphics and Visualization, ACM Press, New York, pp. 127-134 (2004).

* cited by examiner

SYSTEMS AND METHODS FOR TEXTURE-SPACE RAY TRACING OF TRANSPARENT AND TRANSLUCENT OBJECTS

CROSS-REFERENCE TO RELATED APPLICATIONS

This application is a continuation of U.S. application Ser. No. 16/282,117, filed on Feb. 21, 2019, which is hereby incorporated by reference in its entirety.

FIELD

This disclosure generally relates to computer graphics and, more particularly, to systems and methods for texture-space ray tracing of transparent and translucent objects.

BACKGROUND

Computer-generated images are often created by examining a geometric model of a view space and modeled objects in the view space. The geometric model of the objects can have arbitrary resolution, but typically each object is represented by a finite number of polygons, such as triangles, positioned in the view space and having a color, color pattern, or texture over their surface and/or an alpha value or values representing transparency of the polygon. An image is typically output (i.e., stored, displayed, transmitted, or otherwise processed) as a pixel array.

Some scenes may include objects that are transparent or translucent. Rendering transparent or translucent has proved to be difficult. In some conventional approaches, objects with transparency are rendered by blending all surfaces at a pixel location in view space into a single buffer. Each surface occludes existing color and adds some of its own color depending on its alpha value, which represents a ratio of light transmittance. The order in which surfaces are blended affects the total occlusion or visibility of each surface. For a correct result, surfaces must be blended from farthest to nearest or nearest to farthest, depending on the alpha compositing operation. Ordering may be achieved by rendering the geometry in sorted order, for example sorting triangles by depth. However, this process can take a significant amount of time, does not always produce a solution (for example, in the case of intersecting or circularly overlapping geometry), and the implementation is complex.

In some instances, fully ray tracing a scene can solve the problems with rendering transparent or translucent objects discussed above. However, in some applications, such as video games, computational speed is a priority. In video games, frames are rendered very quickly, i.e., in real-time or near real-time, as a user interacts with a video game. As such, ray tracing techniques for (which can take hours or days to render a single frame) rendering transparent or translucent objects are typically not suitable for video games. For this reason, various other techniques have been developed to render transparent or translucent objects in video games in real-time or near-real time. However, these other techniques suffer from poor quality, particularly when compared to the rendering of transparent or translucent objects obtained from full ray tracing.

As such, there remains a need in the art for a system and method for rendering transparent or translucent objects that overcomes the drawbacks and limitations of existing approaches.

SUMMARY

One embodiment provides a method, computer-readable storage medium, and device for rendering a transparent object in a scene. The method comprises: generating, by one or more processors, a first data structure that stores a surface normal value for each location on the transparent object; generating, by the one or more processors, a second data structure that stores a position value in world space of the scene for each location on the transparent object; selecting, by the one or more processors, a valid position value in the second data structure corresponding to a location on the surface of the transparent object; determining, by the one or more processors, a direction of a refraction vector at the location on the surface of the transparent object corresponding to the valid position value, wherein the direction of the refraction vector is based on a surface normal value at the location on the surface of the transparent object corresponding to the valid position value obtained from the first data structure, the position value in world space for the location on the surface of the transparent object obtained from the second data structure, and a camera location of a camera that is capturing an image of the scene; performing, by the one or more processors, ray tracing by launching a ray from the location on the surface of the transparent object corresponding to the valid position value in the direction of the refraction vector; determining, by the one or more processors, a lighting result from performing the ray tracing; and storing, by the one or more processors, the lighting result for the valid position value in a texture map, wherein the texture map is applied to geometry corresponding to the transparent object to render the transparent object.

Another embodiment provides a method, computer-readable storage medium, and device for rendering a translucent object in a scene. The method comprises: generating, by one or more processors, a first data structure that stores a surface normal value for each location on the translucent object, wherein the translucent object comprises a light-scattering medium; generating, by the one or more processors, a second data structure that stores a position value in world space of the scene for each location on the translucent object; selecting, by the one or more processors, a valid position value in the second data structure corresponding to a location on the surface of the translucent object; generating, by the one or more processors, an inverted normal vector from the location on the surface of the translucent object corresponding to the valid position value; identifying, by the one or more processors, a location inside the translucent object along the inverted normal vector; performing, by the one or more processors, ray tracing by launching a plurality of rays from the location inside the translucent object along the inverted normal vector; determining, by the one or more processors, for each ray of the plurality of rays, a lighting result from an intersection of the ray with a surface of the translucent object; aggregating, by the one or more processors, the lighting results corresponding to the plurality of rays into an aggregated lighting value; and storing, by the one or more processors, the aggregated lighting value for the valid position value in a texture map, wherein the texture map is applied to geometry corresponding to the translucent object to render the translucent object.

DETAILED DESCRIPTION

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide a hybrid approach to rendering transparent or translucent objects, which combines object-space ray tracing with texture-space parametrization and integration. The disclosed embodiments can be performed in real-time or near real-time, and are thus suitable for applications such as video games. As discussed in greater detail herein, any transparent or translucent objects are first parameterized using two textures: (1) a texture that stores the surface normal at each location on the transparent or translucent object, and (2) a texture that stores the world space coordinates at each location on the transparent or translucent object. Ray tracing can then be used to streamline and unify the computation of light transport inside thick mediums, such as transparent or translucent objects, with the rest of the scene. For each valid location on the surface of a transparent or translucent object, the disclosed embodiments trace one or more rays through such objects and compute the resulting lighting in an order-independent fashion. The results are stored in a texture, which is then applied during the final lighting stage. Storing the final lighting results in a texture can be beneficial for performance reasons, such as caching results from frame-to-frame if the object does not move. By combining texture-space rendering, ray tracing, and transparency/translucency in a novel way, the disclosed embodiments provide visually convincing light transport through transparent objects (i.e., clear objects with a smooth surface property), semi-transparent objects (i.e., clear objects with a rough surface property), and translucent objects (i.e., objects made of a light scattering medium). The disclosed embodiments also take into account refraction and index-of-refraction transitions between various mediums (i.e., air-to-medium, medium-to-air, medium-to-medium), handle view-dependent physically-based lighting terms, and support optical light attenuation via thick-medium attenuation functions for both static and animated objects in real-time.

Figure 1:
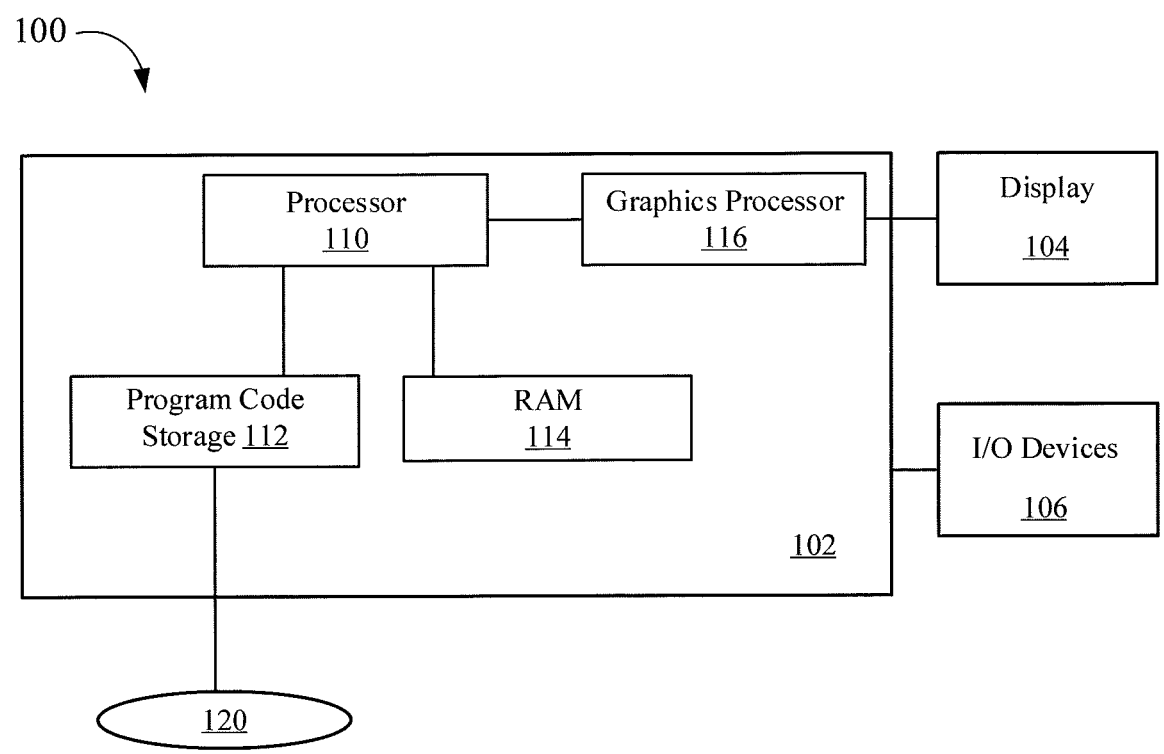
FIG. 1 is a block diagram of a computer system for rendering images, according to aspects of the present disclosure.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
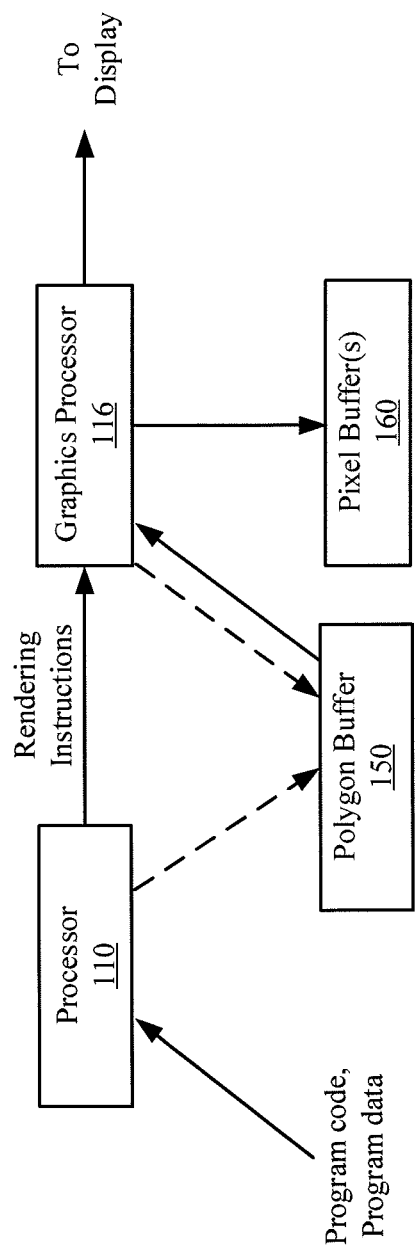
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL or DirectX specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
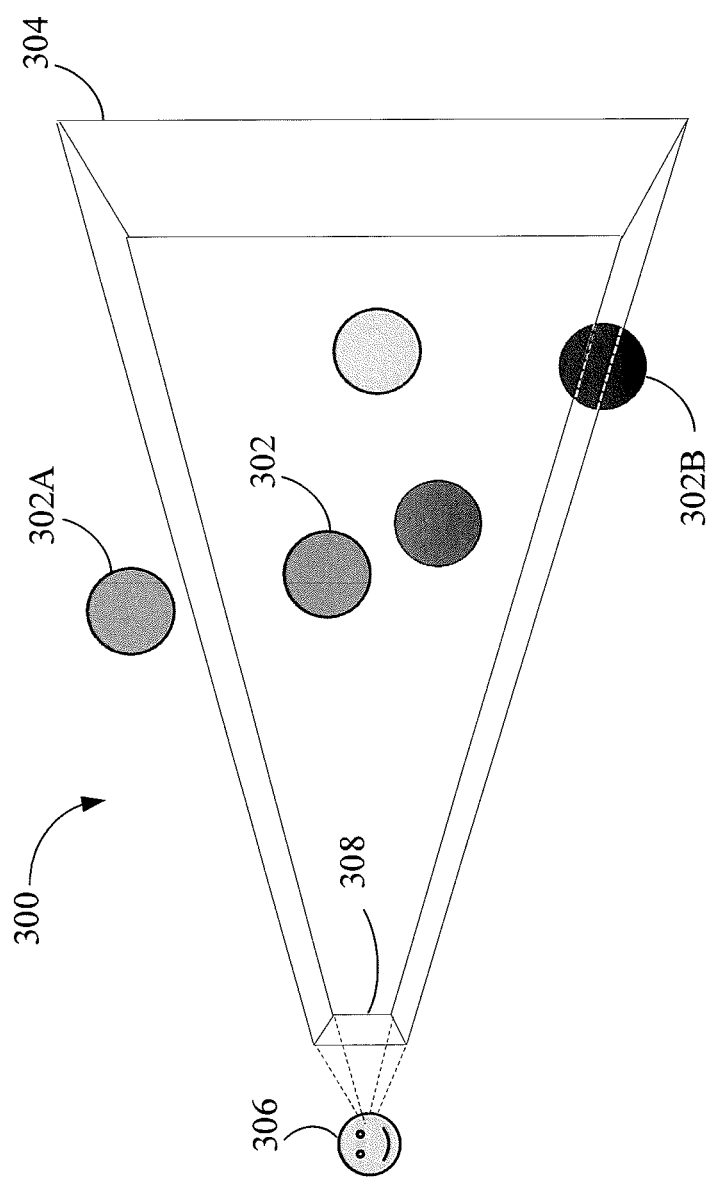
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects 302, 302A-302B. Each object 302 can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects 302 in the scene. Also, the objects 302 can move in the scene 300.

Figures 4A, 4B:
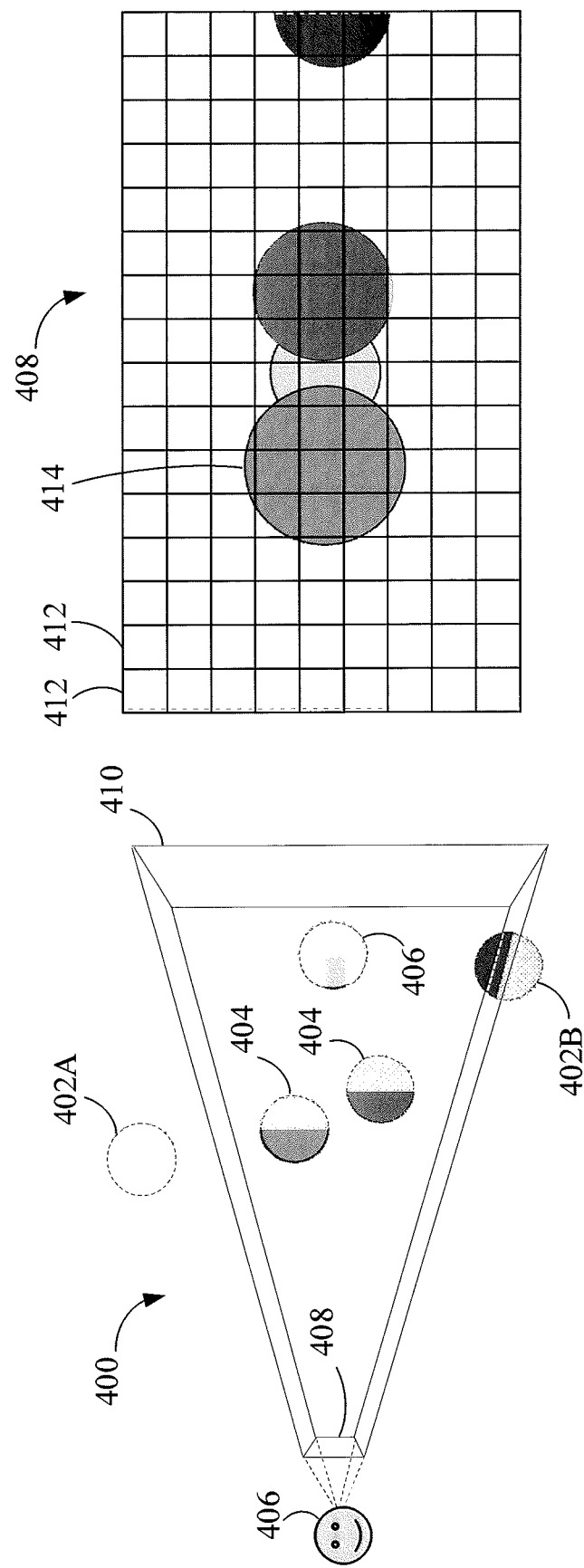
FIG. 4A is a block diagram illustrating rending a scene using rasterization, according to one embodiment.
FIG. 4B is an example of a rasterized image of a scene, according to one embodiment.

FIG. 4A is a block diagram illustrating rendering a scene 400 using rasterization, according to one embodiment. Similar to the image shown in FIG. 3, scene 400 includes a plurality of objects. A camera 406 is configured to capture an image of the scene 400, represented in screen space 408. The camera 406 observes the scene 400 through viewport 410.

The disclosed embodiments involve rasterizing the objects in the scene 400 to generate the image in screen space 408. Rasterization strives to render the pixels as those that are directly visible from the camera 406. Rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of a rasterized image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image with relatively limited information of the actual 3D scene. When one or more of the objects in the scene is non-opaque (i.e., includes properties of transparency or translucency), properly rendering the image can be a difficult problem to solve.

Unlike using rasterization to render transparent or translucent objects, where the rendering of transparent or translucent geometry is often treated separately from opaque geometry, embodiments of the disclosure use ray tracing and texture mapping to streamline and unify the computation of light transport inside thick mediums with the rest of the scene. In the disclosed embodiments, by using ray tracing, interface transitions are easier to track since each transition is part of a chain of intersections, as described in greater detail below.

Figure 5:
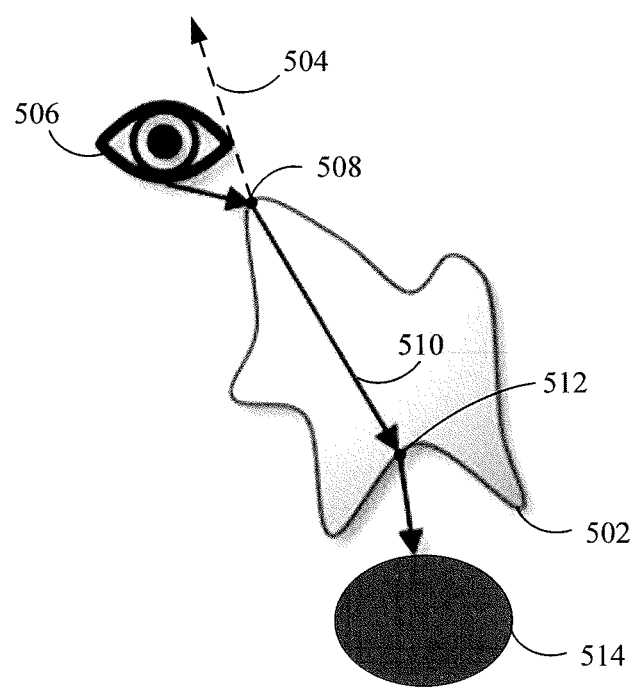
FIG. 5 is a block diagram illustrating light traveling through a transparent object with a smooth surface property, according to one embodiment.
Figure 6B:
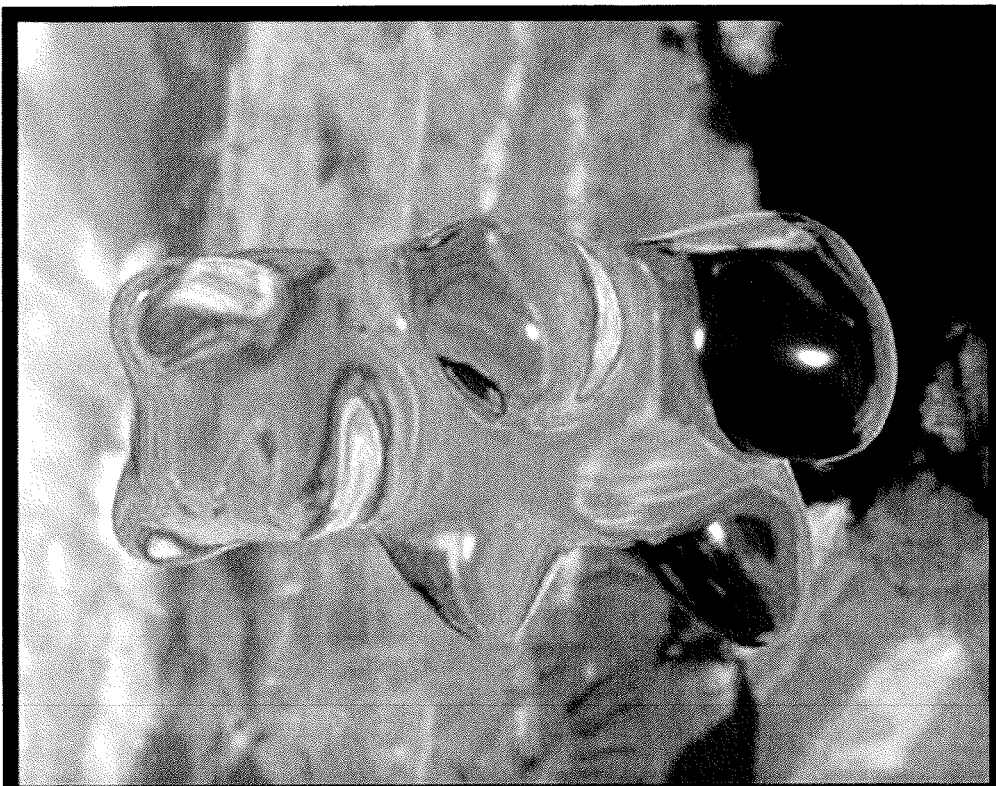
FIGS. 6A and 6B illustrate examples of a transparent object with smooth surface property, according to some embodiments.
Figure 6A:

FIG. 5 is a block diagram illustrating light traveling through a transparent object with a smooth surface property, according to one embodiment. FIGS. 6A and 6B illustrate examples of a transparent object with smooth surface property, according to some embodiments. The objects shown in FIGS. 6A and 6B are shown against different backgrounds, which causes the transparent object to be rendered differently based on the background.

As shown in FIG. 5, a transparent object 502 is in view of a camera 506. Light that is incident on the transparent object 502 (having a smooth surface property) is altered based on the laws of optics and parameters of the medium. For example, refraction occurs based on the refractive index of the object 502 and the refractive index of the medium between the camera 506 and the object 502.

Location 508 on the transparent object 502 is in view of the camera 506. The location 508 is also associated with a surface normal 504. In one implementation, a first texture map can be computed that stores, for each location on the surface of the object, a surface normal at the corresponding location. A second texture map can be computed that stores, for each location on the surface of the object, a world-space position value for the corresponding location. Generating the first and second texture maps is referred to herein as "texture-space parameterization" of the transparent (or translucent) object.

To render the transparent object 502, as described herein, intermediary light transport information is modified and carried with a ray that is cast into the transparent object 502, as part of its payload, which enables the computation of visually-convincing effects. In one implementation, based on the location of the camera 506 relative to the location 508 on the surface of the transparent object 502 and the surface normal 504 at location 508, a refraction vector 510 can determined, for example using Snell's law. In some implementations, the direction of the refraction vector 510 is based on the index of refraction of the transparent object 502 and/or the index of refraction of the medium between the camera 506 and the transparent object 502 (e.g., air). Ray tracing can be performed by launching a ray from the location 508 on the transparent object 502 in the direction of the refraction vector 510. Ray tracing results in the ray exiting the transparent object 502 at location 512. The ray is refracted again at the location 512. The further refracted ray then intersects object 514. In various implementations, ray tracing can continue, i.e., where the ray reflects/refracts from the surface of the object 514 onto another object, and so on. In one embodiment, ray tracing can terminate when the ray exits the transparent object 502 and intersects one other object (such as object 514), or exits the scene or viewport without intersecting any other objects.

Performing ray tracing determines a lighting result for location 508 from accumulating lighting information from each object intersected by the ray as it reflects/refracts through the scene. In an implementation where ray tracing terminates when the ray exits the transparent object 502 and intersects another object, the lighting result is based on the intersection of the ray with another object (e.g., object 514). In an implementation where ray tracing terminates when, after exiting the transparent object 502, the ray exits the scene or viewport without intersecting any other objects, the lighting result is based on a sky or background lighting result (i.e., a default lighting result when no other objects are intersected).

The lighting information from performing the ray tracing contributes to the lighting and color information at location 508. In one embodiment, the lighting information determined from performing ray tracing originating from location 508 can be stored in a texture map for the location 508 corresponding to the transparent object. The ray tracing algorithm described above can be repeated for each valid location on a surface of a transparent object (or a subset thereof), the result of which is stored in the texture map for the corresponding location on the surface of the transparent object (i.e., "texture-space integration"). In some embodiments, a separate texture map can be created for each transparent or translucent object.

In this manner, embodiments of the disclosure provide a hybrid approach that combines texture-space parameterization with object-space ray tracing and texture-space integration. In some implementations, textures provide a stable integration domain, as well as a predictable memory footprint. Object-space parametrization in texture-space for ray tracing also brings a predictable number of rays-per-object-per-frame, and can therefore be budgeted. This level of predictability is useful for real-time constraints, such as in video games.

Figure 7:
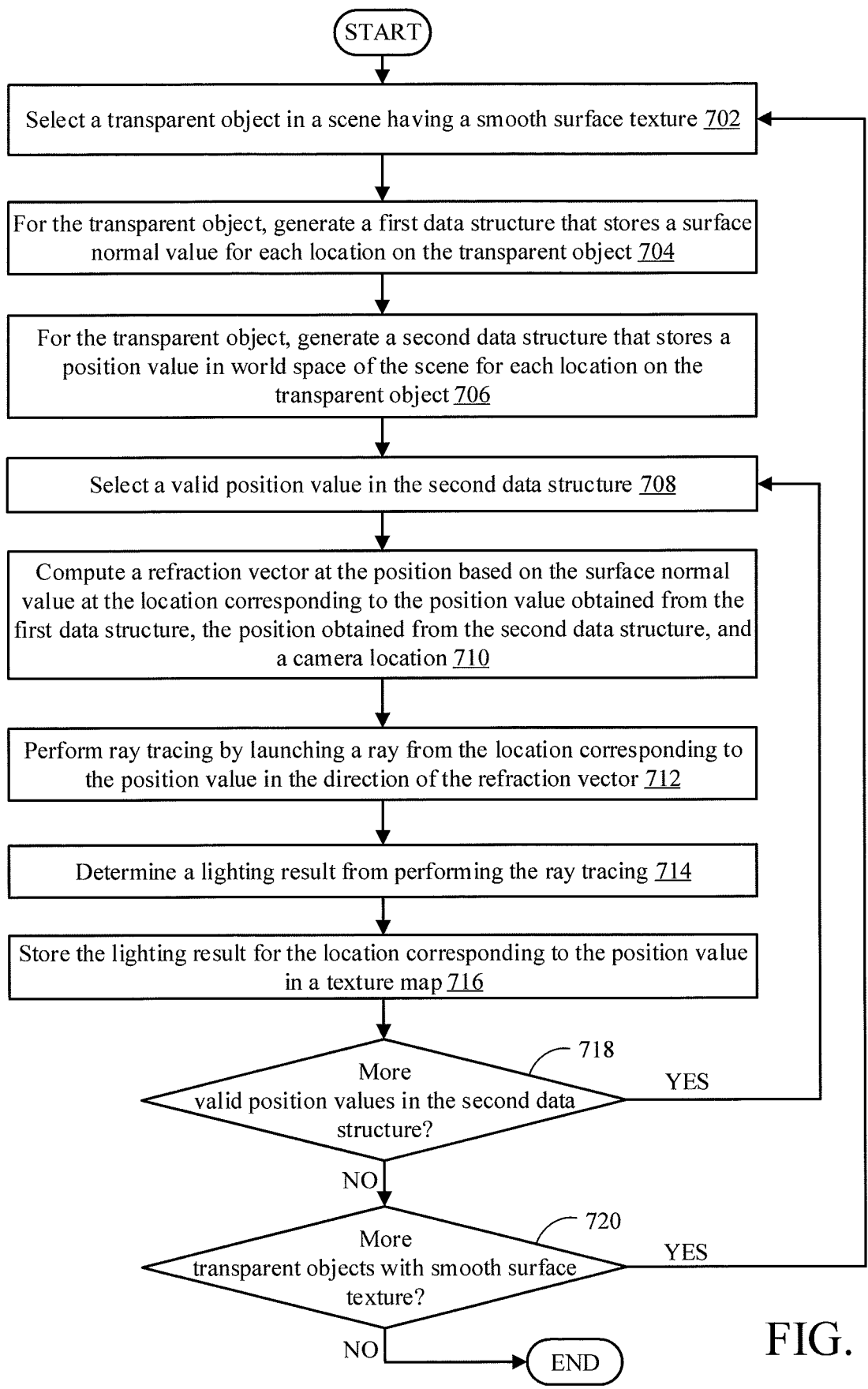
FIG. 7 is a flow diagram of method steps for rending transparent objects in a scene that have a smooth surface property.

FIG. 7 is a flow diagram of method steps for rendering transparent objects in a scene that have a smooth surface property. In various implementations, the method can be performed by the processor 110, the graphics processor 116, or a combination of the processor 110 and the graphics processor 116.

As shown, the method begins at step 702, where a processor selects a transparent object in a scene having a smooth surface property. At step 704, the processor generates, for the transparent object selected at step 702, a first data structure that stores a surface normal value for each position on the transparent object. The surface normal values may be three-dimensional values (i.e., x, y, and z). In one embodiment, the first data structure comprises a texture map. In another embodiment, any data structure that stores a surface normal value for each location on the transparent object can be used.

At step 706, the processor generates, for the transparent object, a second data structure that stores a position value in world space of the scene for each location on the transparent object. The position values may be three-dimensional values (i.e., x, y, and z). In one embodiment, the second data structure comprises a texture map. In another embodiment, any data structure that stores a position value for each location on the transparent object can be used.

It is noted that generating the first data structure and the second data structure can be performed just once, and does not need to be repeated each frame, if the object does not move.

At step 708, the processor selects a valid position value in the second data structure. In one embodiment, each position value in the second data structure may be considered a valid position value. In another embodiment, valid position values in the second data structure are those position values that are visible to a camera that is capturing an image of the scene to be rendered.

At step 710, the processor computes a refraction vector at the position value (selected at step 708) based on a surface normal value at the location corresponding to the position value obtained from the first data structure, the position value obtained from the second data structure, and a camera location and of the camera that is capturing an image of the scene to be rendered.

At step 712, the processor performs ray tracing by launching a ray from the location corresponding to position value in the direction of the refraction vector. In one embodiment, for transparent objects that have a smooth surface property, a single ray can be sufficient, since the smooth surface property of the object provides for smooth refraction with little or no scattering at the surface of the object. When the surface property of the object is rougher, more rays may be cast, as discussed below in reference to FIGS. 13-15.

At step 714, the processor determines a lighting result from performing the ray tracing. The lighting result corresponds to accumulating lighting information from each object intersected by the ray as it reflects/refracts through the scene during ray tracing. In an implementation where ray tracing terminates when the ray exits the transparent object and intersects another object, the lighting result is based on the intersection of the ray with another object. In an implementation where ray tracing terminates when, after exiting the transparent object, the ray exits the scene or viewport without intersecting any other objects, the lighting result is based on a sky or background lighting result (i.e., a default result when no other objects are intersected). In various implementations, ray tracing can continue for one or more intersections after exiting the transparent object, i.e., where the ray reflects/refracts from the surface of one object, then another object, and so on. The number of intersections to perform during ray tracing can be configurable, for example, based on performance requirements.

At step 716, the processor stores the lighting result from performing the ray tracing for the location correspond to the position value in a texture map. Texture mapping is a rendering process in which a two-dimensional (2D) surface, called a "texture map," is applied to a 3D object, i.e., the texture map is "wrapped around" the 3D object. As such, the 3D object acquires a surface property similar to that of the 2D surface. The texture map can be applied to the geometry in a scene during a texture mapping pass.

At step 718, the processor determines whether more valid position values in the second data structure are left to be processed. If yes, the method returns to step 708, described above. If the processor determines that no more valid position values in the second data structure are left to be processed, the method proceeds to step 720.

At step 720, the processor determines whether more transparent objects in the scene that have a smooth surface property are left to be processed. If yes, the method returns to step 702, described above. If the processor determines that no more transparent objects in the scene that have a smooth surface property are left to be processed, the method ends.

The process described in FIG. 7 is repeated frame-to-frame to render the scene. In some embodiments, temporal filtering can be applied to accumulate lighting results stored in the final texture map over a series of multiple frames.

Also, objects and the camera can move within the scene; nevertheless, implementing the disclosed method results in visually pleasing rendering of the transparent objects. Also, as noted above, if the transparent objects do not move within the scene from frame-to-frame, the first and second data structures that parameterize the object do not need to be recomputed again, as the values remain the same. This feature provides an added efficiency in the rendering of the transparent object. In some embodiments, for colored transparent object (e.g., colored glass), a chromatic aberration offset can be added to the texture map results to tint the transparent object by color.

Figure 9:
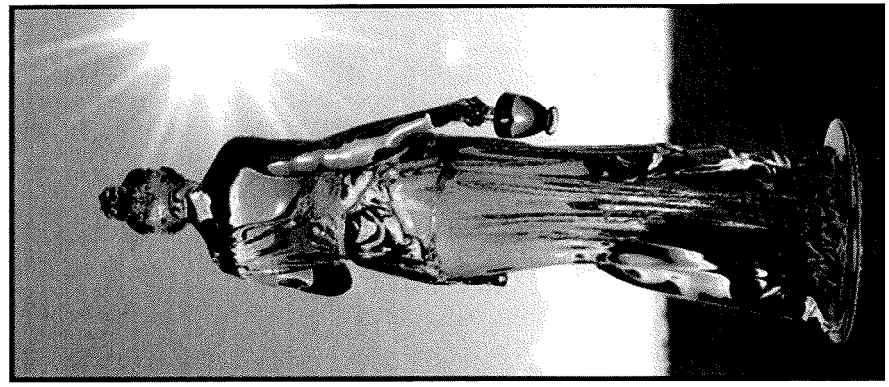
FIGS. 8-9 are examples of a transparent object with a smooth surface property, according to one embodiment.
Figure 8:
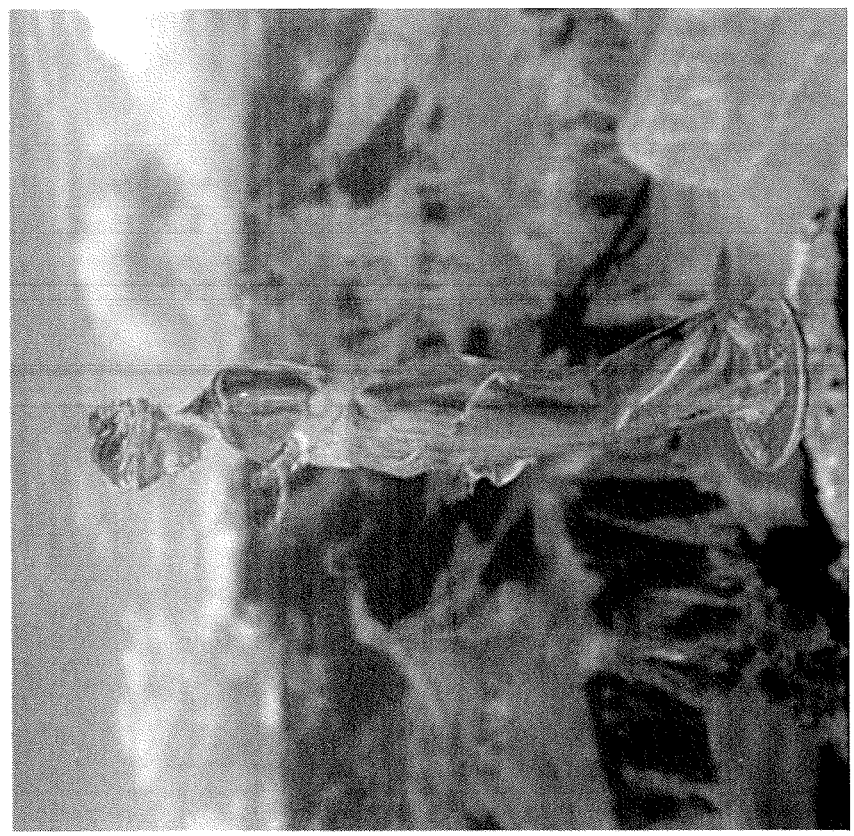
Figure 10:
FIG. 10 is an example of a texture map that stores, for each location on a surface of an object, a surface normal at the position, according to one embodiment.
Figure 11:
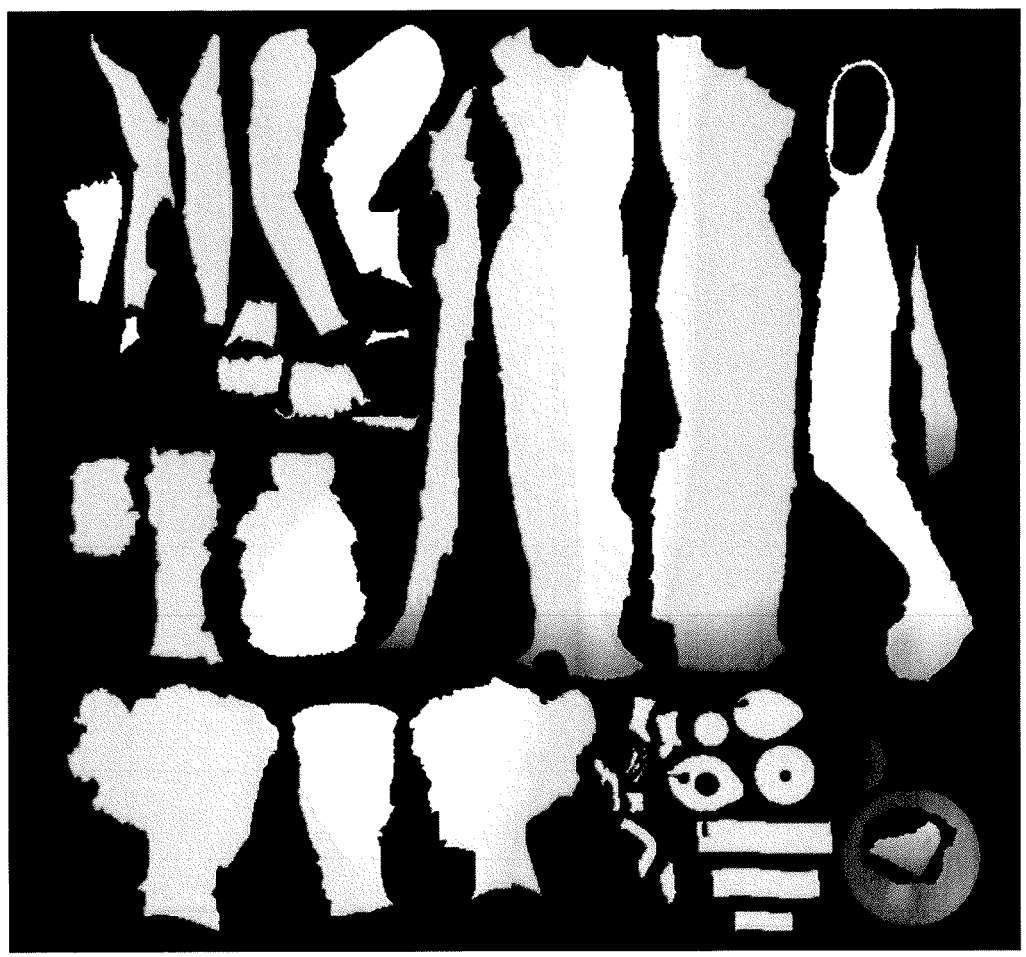
FIG. 11 is an example of a texture map that stores, for each location on a surface of an object, a position value for the location on the surface of the object in world space of the scene, according to one embodiment.

FIGS. 8-9 are examples of a transparent object with a smooth surface property, according to one embodiment. In FIG. 8, the transparent object is a clear glass statue with a smooth surface. In FIG. 9, the transparent object is a colored glass statue with a smooth surface. FIGS. 10-11 provide an example of texture-space parameterization for the object shown in FIGS. 8-9, according to one embodiment.

FIG. 10 is an example of a texture map that stores, for each location on a surface of an object, a surface normal at the position, according to one embodiment. The surface normal may be a three-dimensional vector (x, y, z) in world space of the scene. In the example shown, the texture map that stores the surface normals may be represented by colors, such as red for positive x-value, green for positive y-value, and blue for positive z-value, where negative values of x-, y-, or z- are black.

FIG. 11 is an example of a texture map that stores, for each location on a surface of an object, a position value for the location on the surface of the object in world space of the scene, according to one embodiment. The position value may be a three-dimensional (x, y, z) position value in world space of the scene. In the example shown, the texture map that stores the position values may be represented by colors, such as red for positive x-value, green for positive y-value, and blue for positive z-value, where negative values of x-, y-, or z- are black.

Figure 12:
FIG. 12 is an example of a final texture map that stores, for each valid position value on a surface of an object, a lighting result from performing ray tracing beginning from the valid location on the surface of the object, according to one embodiment.

FIG. 12 is an example of a final texture map that stores, for each valid position value on a surface of an object, a lighting result from performing ray tracing beginning from the valid location on the surface of the object, according to one embodiment. In one embodiment, each position value is considered valid, thus the final texture map stores lighting results for each position value of the object. In another embodiment, to save on computation, a position value on an object is considered valid if it is visible to the camera, thus the final texture map stores lighting results for a subset of the visible position value of the object. The texture map shown in FIG. 12 can be applied to the geometry in a scene during a texture mapping pass.

As described above, the disclosed embodiments can be used to render transparent objects that have a smooth surface property by launch one ray for each valid position value. As described below, the disclosed embodiments can also be used to render transparent objects that have a rough (non-smooth) surface property by launching multiple rays for each valid position value.

Figure 13:
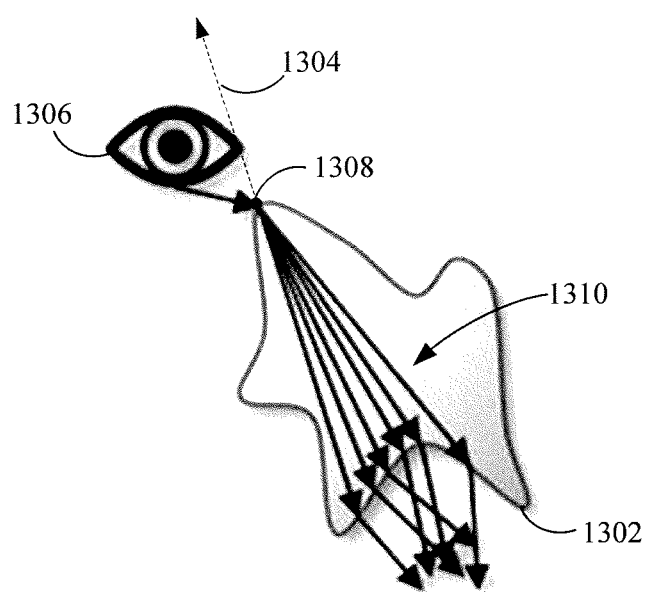
FIG. 13 is a block diagram illustrating light traveling through a transparent object with a rough surface property, according to one embodiment.
Figure 14B:
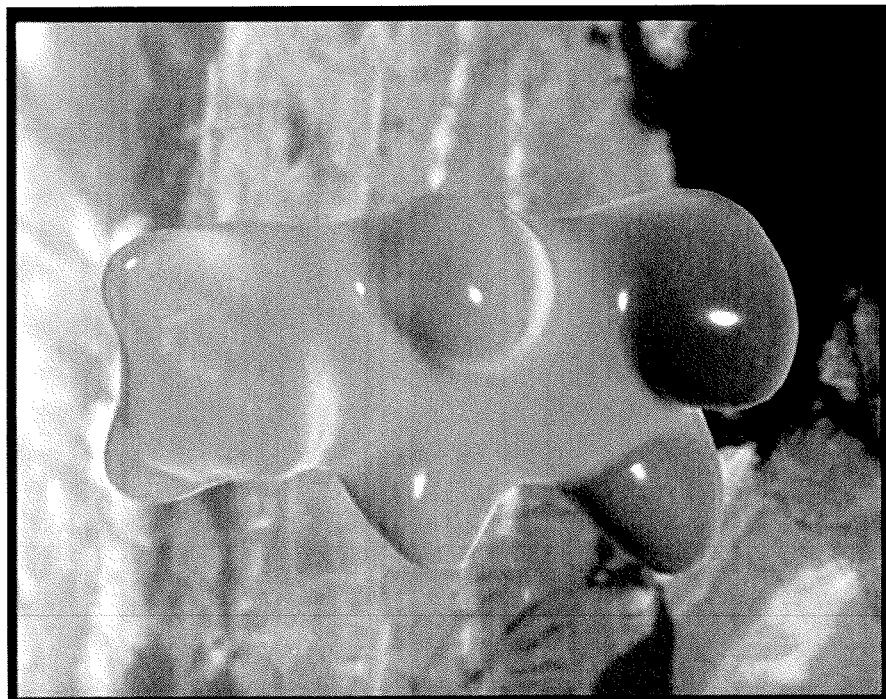
FIGS. 14A and 14B illustrate examples of a transparent object with a rough surface property, according to some embodiments.
Figure 14A:
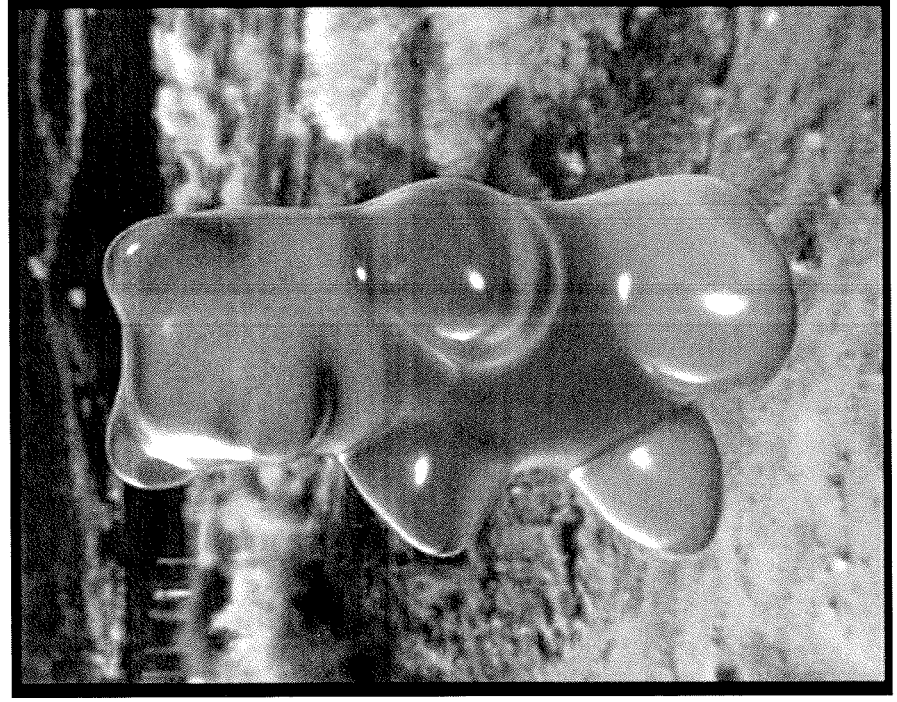

FIG. 13 is a block diagram illustrating light traveling through a transparent object with a rough surface property, according to one embodiment. FIGS. 14A and 14B illustrate examples of a transparent object with a rough surface property, according to some embodiments. The object shown in FIGS. 14A and 14B is shown against different backgrounds, which results in different rendering of the object.

As shown in FIG. 13, a transparent object 1302 with a rough surface property is in view of a camera 1306. Location 1308 on the surface of the transparent object 1302 is in view of the camera 1306. The location 1308 is also associated with a surface normal 1304.

In one implementation, a first texture map can be computed that stores, for each location on the surface of the object, a surface normal at the location. A second texture map can be computed that stores, for each location on the surface of the object, a world-space position value for the location. Generating the first and second texture maps is referred to herein as "texture-space parameterization," as discussed above for transparent objects with a smooth surface property. In one implementation, the texture-space parameterization for a transparent object with a rough surface property is the same as the texture-space parameterization for a transparent object with a smooth surface property, discussed above.

However, since the surface of the transparent object is rough and not smooth, incident light that interacts with the surface of the transparent object is scattered at the surface of the object. This scattering effect is due to microfacets on the surface of the transparent object, which give the object its rough surface property.

According to embodiments of the disclosure, based on the location of the camera relative to the location 1308 on the surface of the transparent object 1302 and the surface normal 1304 at location 1308, stochastic hemispherical sampling can be used to generate one or more refraction vectors 1310. Ray tracing is performed by launching one or more rays from the location 1308 on the transparent object 1302 in the direction of the refraction vectors 1310. In some embodiments, just one ray is cast per frame, and the results are accumulated over several frames. In other embodiments, multiple rays can be cast per frame.

Ray tracing results in the ray exiting the transparent object 1302. It is noted that since the object 1302 is a transparent object, the rays travel unimpeded though the medium of the object, as the medium is not a light scattering medium. It is the surface of the object 1302 that is rough, which results is light scattering at the surface of the object, but not within the medium.

The rays are refracted again upon exiting the object 1302. The refracted rays can then intersect other objects in the scene. In various implementations, ray tracing can continue, i.e., where the ray reflects/refracts from the surface of one object, then another object, and so on. In one embodiment, ray tracing can terminate when the ray exits the transparent object 1302 and intersects with one other object, or exits the scene or viewport without intersecting any other objects.

The result of performing ray tracing is determining a lighting result from accumulating lighting information from each object intersected by the ray as it reflects/refracts through the scene. In an implementation where ray tracing terminates when the ray exits the transparent object 1302 and intersects with one other object, the lighting result is based on the intersection of the ray with the one other object. In an implementation where ray tracing terminates when, after exiting the transparent object 1302, the ray exits the scene or viewport without intersecting any other objects, the lighting result is based on a sky or background lighting result (i.e., a default lighting result when no other objects are intersected).

The lighting information from performing the ray tracing can be aggregated across multiple rays per frame and/or multiple rays over multiple frames. In some embodiments, aggregating the lighting information comprises averaging the lighting information for multiple rays. Some embodiments include aggregating the lighting information by modulating the lighting information for the different rays with the Beer-Lambert law or with the Henyey-Greenstein phase function.

The aggregated results can be stored in a texture map corresponding to the location 1308 on the transparent object. The ray tracing algorithm described above can be repeated for each location on a surface of a transparent object (or a subset thereof), the result of which is stored in the texture map corresponding to the object 1302 (i.e., "texture-space integration").

Figure 15:
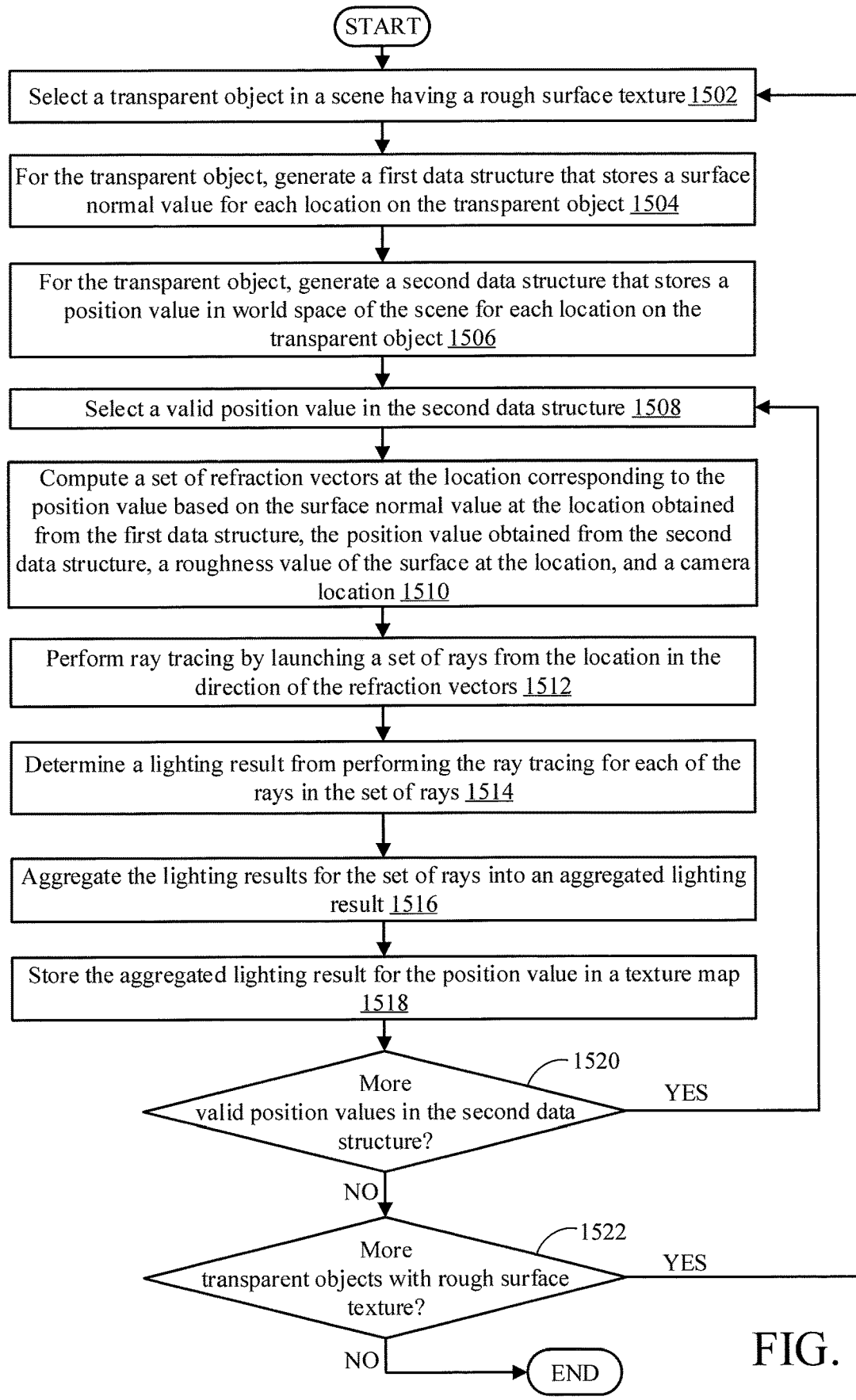
FIG. 15 is a flow diagram of method steps for rendering transparent objects in a scene that has a rough surface property, according to one embodiment.

FIG. 15 is a flow diagram of method steps for rending transparent objects in a scene that has a rough (i.e., non-smooth) surface property, according to one embodiment. In various implementations, the method can be performed by the processor 110, the graphics processor 116, or a combination of the processor 110 and the graphics processor 116.

As shown, the method begins at step 1502, where a processor selects a transparent object in a scene having a rough surface property. At step 1504, the processor generates, for the transparent object selected at step 1502, a first data structure that stores a surface normal value for each location on the transparent object. The surface normal values may be three-dimensional values (i.e., x, y, and z). In one embodiment, the first data structure comprises a texture map. In another embodiment, any data structure that stores a surface normal value for each location on the transparent object can be used.

At step 1506, the processor generates, for the transparent object, a second data structure that stores a position value in world space of the scene for each location on the transparent object. The position values may be three-dimensional values (i.e., x, y, and z). In one embodiment, the second data structure comprises a texture map. In another embodiment, any data structure that stores a position value for each location on the transparent object can be used.

It is noted that generating the first data structure and the second data structure can be performed just once, and does not need to be repeated each frame, if the object does not move.

At step 1508, the processor selects a valid position value in the second data structure. In one embodiment, each position value in the second data structure may be considered valid. In another embodiment, valid position values in the second data structure are those position values that are visible to a camera that is capturing an image of the scene to be rendered.

In one embodiment, steps 1502, 1504, 1506, and 1508 in FIG. 15 are similar to steps 702, 704, 706, and 708, respectively, shown in FIG. 7.

At step 1510, the processor computes a set of refraction vectors at the location corresponding to the position value based on the surface normal value at the location obtained from the first data structure, the position value obtained from the second data structure, a roughness value of the surface at the location, and a camera location. As described, since the surface of the transparent object is rough and not smooth, incident light that interacts with the surface of the transparent object is scattered at the surface of the object. This scattering effect is due to microfacets on the surface of the transparent object, which give the object its rough surface property. In one embodiment, stochastic hemispherical sampling can be used to generate the set of refraction vectors.

At step 1512, the processor performs ray tracing by launching a set of rays from the location on the surface of the transparent object in the direction of the refraction vectors. In various implementations, one or more ray may be launched per frame, depending on performance requirements.

At step 1514, the processor determines a lighting result from performing the ray tracing for each of the rays in the set of rays. In one embodiment, determining a lighting result, for each ray in step 1514, is similar to determining a lighting result for a single ray in step 714 in FIG. 7.

At step 1516, the processor aggregates the lighting results of one or more rays into an aggregated lighting result. In some embodiments, aggregating the lighting results comprises averaging the light results corresponding to multiple rays. Other embodiments include aggregating the lighting results by modulating the lighting results for the different rays with the Beer-Lambert law or with the Henyey-Greenstein phase function.

At step 1518, the processor stores the aggregated lighting result for the position value in a texture map. In one embodiment, storing the aggregated lighting result in a texture map in step 1518, is similar to storing the aggregated lighting result in a texture map in step 716 in FIG. 7.

At step 1520, the processor determines whether more valid position values in the second data structure are left to be processed. If yes, the method returns to step 1508, described above. If the processor determines that no more valid position values in the second data structure are left to be processed, the method proceeds to step 1522.

At step 1522, the processor determines whether more transparent objects in the scene that have a rough surface property are left to be processed. If yes, the method returns to step 1502, described above. If the processor determines that no more transparent objects in the scene that have a rough surface property are left to be processed, the method ends.

Some embodiments of the disclosure can also be used to render translucent objects. Contrary to transparent objects, which do not scatter light that travels within the medium, translucent objects do scatter light that travels within the medium. Similar to rendering transparent objects, embodiments of the disclosure first parametrize translucent objects in texture-space. The translucent object is parameterized using (1) a first texture that stores, for each location on the translucent object, a surface normal at the location, and (2) a second texture that stores, for each location on the translucent object, a position value in world space at the location.

After texture-space parameterization with the first and second textures, embodiments of the disclosure launch one or more rays inside the medium, compute the resulting lighting at intersections, and approximate subsurface scattering. The results are stored in a final texture, which is then applied during the final lighting stage. By combining texture-space rendering with raytracing, embodiments of the disclosure provide visually convincing light scattering inside a translucent object by handling varying medium thickness, self-occlusion and object-to-object occlusion, for both static and dynamic scenes in real-time.

FIGS. 16A-16F are schematic diagrams that illustrate rending a translucent object, according one embodiment of the disclosure.

Figure 16C:
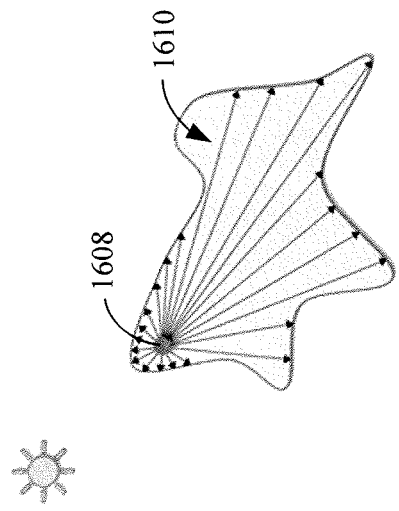
FIGS. 16A-16F are schematic diagrams that illustrate rendering a translucent object, according one embodiment of the disclosure.
Figure 16F:
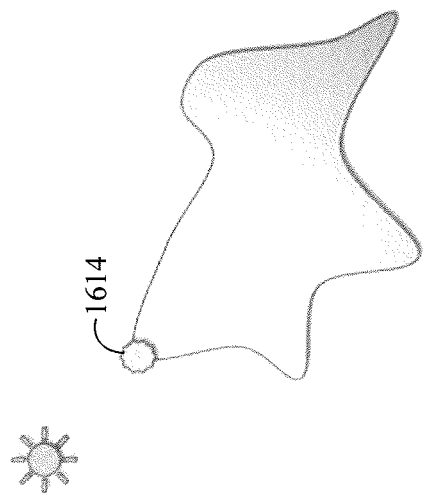
Figure 16B:
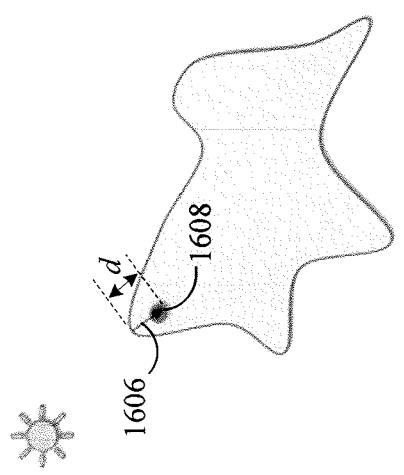
Figure 16E:
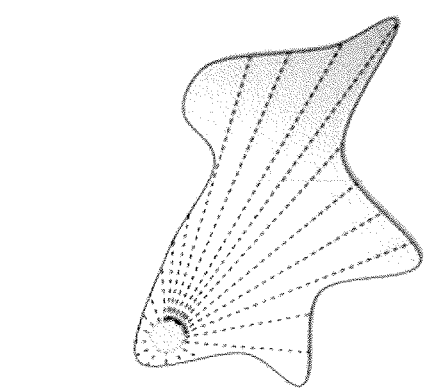
Figure 16A:
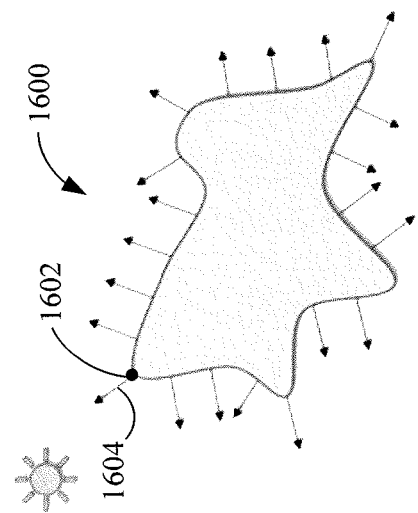

In FIG. 16A, a valid location 1602 on a surface of a translucent object 1600 is shown. A normal vector 1604 for the location 1602 is obtained from a parameterization texture that stores the surface normals. In FIG. 16B, the normal vector 1604 is inverted inside the object 1600 as inverted vector 1606. A location 1608 at a distance d along the inverted vector 1606 is determined. The value of the distance d can be configurable. In FIG. 16C, rays 1610 are launched for ray tracing originating at location 1608. In one embodiment, the distribution of rays is spherical. In various embodiments, multiple rays can be launched at once, or just one ray could be launched per frame, depending on performance requirements.

Figure 16D:
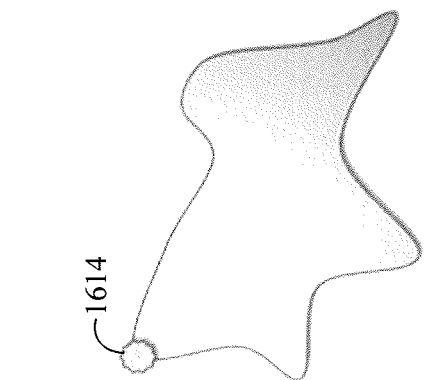

In FIG. 16D, a lighting result is computed at the intersections 1612 of each of the rays 1610 with the surface of the object 1600. In FIG. 16E, the lightings results at the points of intersection 1612 of the multiple rays 1610 are aggregated. In one embodiment, the aggregation importance-samples rays based on a distance-based attenuation function, such as the Beer-Lambert law, so that rays that interest the object 1600 closer to location 1608 are given greater weighting. In FIG. 16F, the aggregated results provide a final lighting value 1614 for location 1602 on the surface of the object 1600.

In some embodiments, the final lighting value 1614 converges over multiple frames via temporal accumulation frame-to-frame. In some embodiments, spatial filtering can also be used as well to combine results from nearby locations on the object, although any denoising advantage from spatial filtering may be muted due to the diffuse nature of the effect for translucent objects. Since lighting conditions can change when objects move, the temporal filter is configured to invalidate results that are no longer valid. In some embodiments, an exponential moving average can be sufficient to perform temporal filtering. In other embodiments, to improve response time and stability, an adaptive temporal filter based on exponential averaging can be used, which varies its hysteresis to quickly re-converge to dynamically changing conditions. The aggregated lighting results are stored in a final texture, which is then applied during the final lighting stage. In some embodiments, chromatic aberration can also be applied, to approximate wavelength-dependent refraction in the translucent object.

Figure 18:
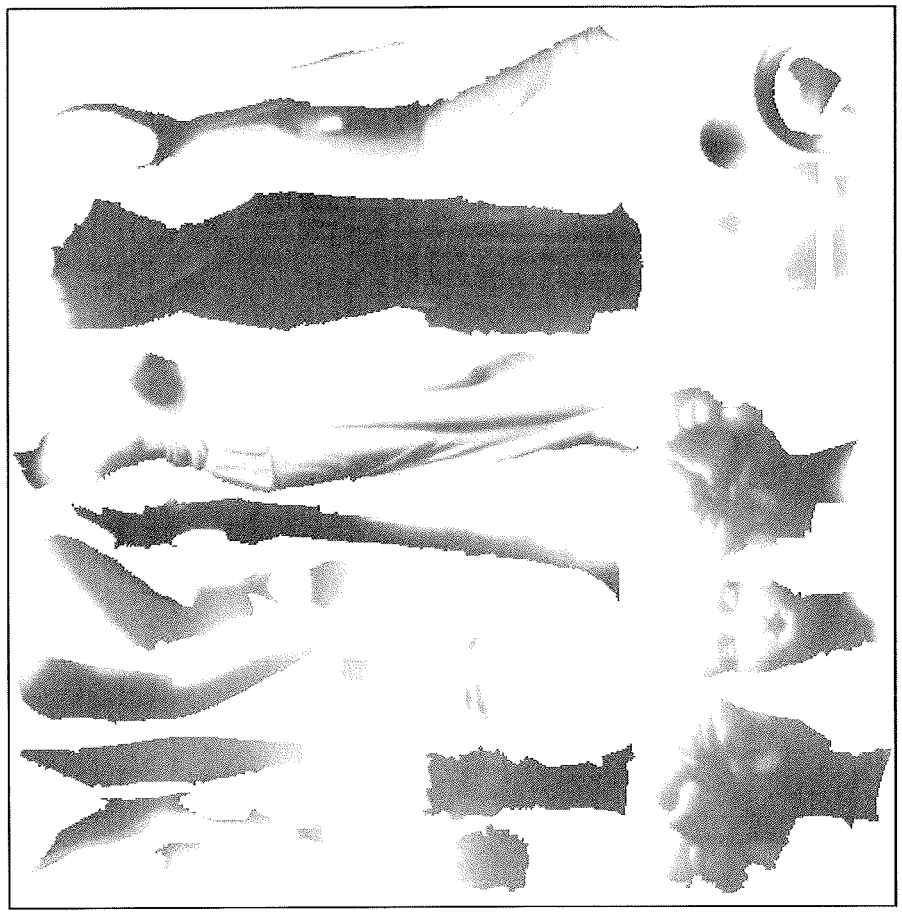
FIG. 18 is an example of a final texture map to be applied to the geometry of the translucent object, according to one embodiment.
Figure 17:
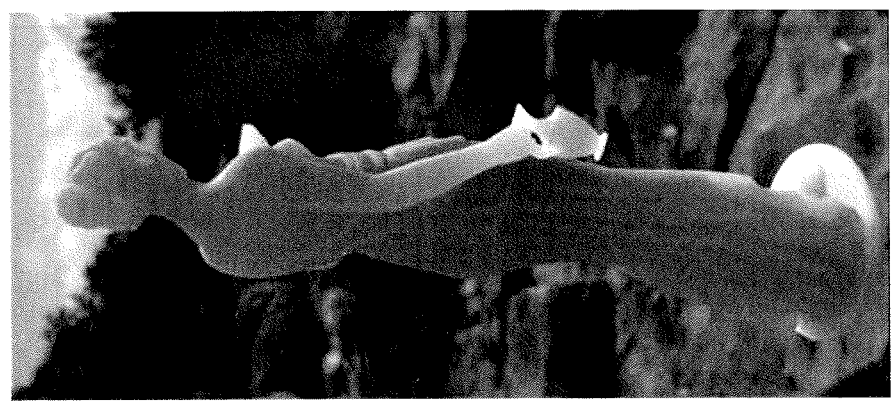
FIG. 17 is an example of a translucent object, according to one embodiment.

FIG. 17 is an example of a translucent object, according to one embodiment. FIG. 18 is an example of a final texture map to be applied to the geometry of the translucent object, according to one embodiment.

Figure 19:
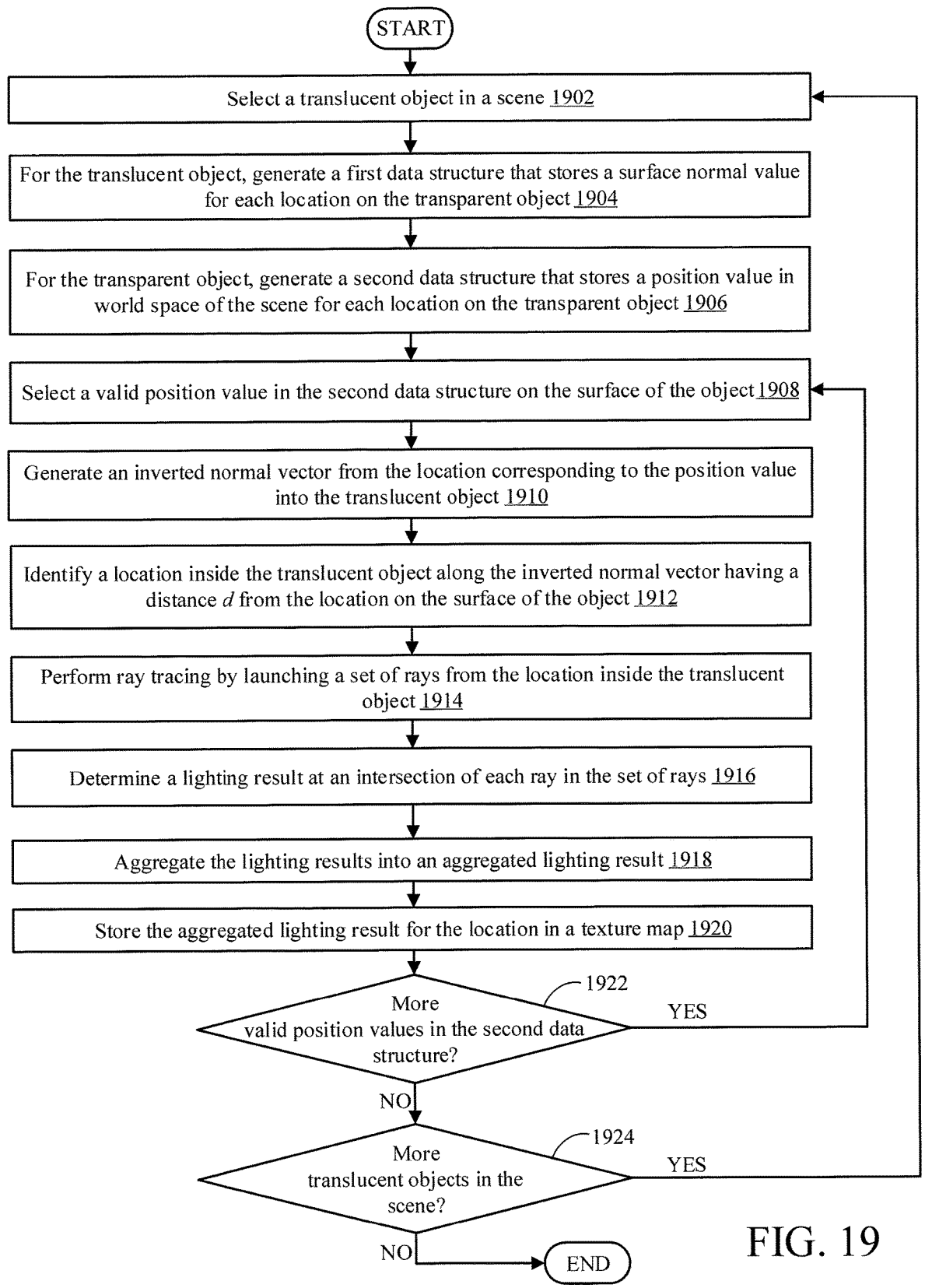
FIG. 19 is a flow diagram of method steps for rending translucent objects in a scene, according to one embodiment.

FIG. 19 is a flow diagram of method steps for rendering translucent objects in a scene, according to one embodiment. In various implementations, the method can be performed by the processor 110, the graphics processor 116, or a combination of the processor 110 and the graphics processor 116.

As shown, the method begins at step 1902, where a processor selects a translucent object in a scene. At step 1904, the processor generates, for the translucent object selected at step 1902, a first data structure that stores a surface normal value for each location on the translucent object. The surface normal values may be three-dimensional values (i.e., x, y, and z). In one embodiment, the first data structure comprises a texture map. In another embodiment, any data structure that stores a surface normal value for each location on the transparent object can be used.

At step 1906, the processor generates, for the translucent object, a second data structure that stores a position value in world space of the scene for each location on the translucent object. The position values may be three-dimensional values (i.e., x, y, and z). In one embodiment, the second data structure comprises a texture map. In another embodiment, any data structure that stores a position value for each location on the translucent object can be used.

It is noted that generating the first data structure and the second data structure can be performed just once, and does not need to be repeated each frame, if the object does not move.

At step 1908, the processor selects a valid position value in the second data structure. In one embodiment, each position value in the second data structure may be considered valid. In another embodiment, valid position values in the second data structure are those position values that are visible to a camera that is capturing an image of the scene to be rendered.

In one embodiment, steps 1902, 1904, 1906, and 1908 in FIG. 19 are similar to steps 702, 704, 706, and 708, respectively, in FIG. 7.

At step 1910, the processor generates an inverted normal vector from the location corresponding to the position value into the translucent object. At step 1912, the processor identifies a location inside the translucent object along the inverted normal vector having a distance d from the location on the surface of the object. In some embodiments, the distance d is configurable.

At step 1914, the processor performs ray tracing by launching a set of rays from the location inside the translucent object. In one embodiment, the distribution of rays in the set of rays is spherical. In various embodiments, multiple rays can be launched at once per frame, or just one ray could be launched per frame, depending on performance requirements.

At step 1916, the processor determines a lighting result at an intersection of each ray in the set of rays with the surface of the translucent object. At step 1918, the processor aggregates the lighting results into an aggregated lighting result. In one embodiment, aggregating the rays comprises importance-sampling rays based on a distance-based attenuation function, such as Beer-Lambert law, such that rays that interest the translucent object closer to the location on the surface selected at step 1908 (or the location from which the rays are launched) are given greater weighting.

At step 1920, the processor stores the aggregated lighting result corresponding to the location on the surface of the object corresponding to the position value in a texture map. In one embodiment, storing the aggregated lighting result in a texture map in step 1920 in FIG. 19 is similar to storing the aggregated lighting result in a texture map in step 716 in FIG. 7.

At step 1922, the processor determines whether more valid position values in the second data structure are left to be processed. If yes, the method returns to step 1908, described above. If the processor determines that no more valid position values in the second data structure are left to be processed, the method proceeds to step 1924.

At step 1924, the processor determines whether more translucent objects in the scene are left to be processed. If yes, the method returns to step 1902, described above. If the processor determines that no more translucent objects in the scene are left to be processed, the method ends.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for rendering a translucent object in a scene, the method comprising:
   selecting, by one or more processors, a first location on a surface of the translucent object;
   generating, by the one or more processors, an inverted normal vector from the first location on the surface of the translucent object;
   identifying, by the one or more processors, a second location inside the translucent object along the inverted normal vector;
   performing, by the one or more processors, ray tracing by launching a plurality of rays from the second location inside the translucent object along the inverted normal vector;
   determining, by the one or more processors, for each ray of the plurality of rays, a lighting result from an intersection of the ray with a surface of the translucent object;
   aggregating, by the one or more processors, the lighting results corresponding to the plurality of rays into an aggregated lighting value; and
   storing, by the one or more processors, the aggregated lighting value for the first location on the surface of the translucent object in a data structure, wherein the aggregated lighting value is configured to be applied to geometry corresponding to the translucent object to render the translucent object.

2. The method according to claim 1, wherein the data structure comprises a texture map that is configured to be applied to the geometry corresponding to the translucent object to render the translucent object.

3. The method according to claim 1, wherein the first location on the surface of the translucent object is visible to a camera that captures the scene.

4. The method according to claim 1, wherein aggregating the lighting results comprises:
applying a distance-based attenuation function to the lighting results corresponding to the plurality of rays, so that rays that interest the translucent object closer to the first location on the surface of the translucent object are given greater weighting.

5. The method according to claim 1, wherein the plurality of rays are launched in a spherical distribution from the second location inside the translucent object along the inverted normal vector.

6. The method according to claim 1, wherein performing the ray tracing comprises:
launching a first ray in the plurality of rays from the second location inside the translucent object along the inverted normal vector in a first frame, wherein the first ray intersects the surface of the translucent object at a first intersection location, wherein the first intersection location corresponds to a first lighting result; and
launching a second ray in the plurality of rays from the second location inside the translucent object along the inverted normal vector in a second frame, wherein the second ray intersects the surface of the translucent object at a second intersection location, wherein the second intersection location corresponds to a second lighting result;
wherein aggregating the lighting results comprises aggregating the first lighting result and the second light result.

7. The method according to claim 1, wherein a distance value between the first location on the surface of the translucent object and the second location inside the translucent object along the inverted normal vector from which the plurality of rays is launched is configurable.

8. A non-transitory computer-readable storage medium storing instructions that, when executed by one or more processors, causes a computing device to render a translucent object in a scene, by performing the steps of:
selecting a first location on a surface of the translucent object;
generating an inverted normal vector from the first location on the surface of the translucent object;
identifying a second location inside the translucent object along the inverted normal vector;
performing ray tracing by launching a plurality of rays from the second location inside the translucent object along the inverted normal vector;
determining for each ray of the plurality of rays, a lighting result from an intersection of the ray with a surface of the translucent object;
aggregating the lighting results corresponding to the plurality of rays into an aggregated lighting value; and
storing the aggregated lighting value for the first location on the surface of the translucent object in a data structure, wherein the aggregated lighting value is configured to be applied to geometry corresponding to the translucent object to render the translucent object.

9. The computer-readable storage medium according to claim 8, wherein the data structure comprises a texture map that is configured to be applied to the geometry corresponding to the translucent object to render the translucent object.

10. The computer-readable storage medium according to claim 8, wherein the first location on the surface of the translucent object is visible to a camera that captures the scene.

11. The computer-readable storage medium according to claim 8, wherein aggregating the lighting results comprises:
applying a distance-based attenuation function to the lighting results corresponding to the plurality of rays, so that rays that interest the translucent object closer to the first location on the surface of the translucent object are given greater weighting.

12. The computer-readable storage medium according to claim 8, wherein the plurality of rays are launched in a spherical distribution from the second location inside the translucent object along the inverted normal vector.

13. The computer-readable storage medium according to claim 8, wherein performing the ray tracing comprises:
launching a first ray in the plurality of rays from the second location inside the translucent object along the inverted normal vector in a first frame, wherein the first ray intersects the surface of the translucent object at a first intersection location, wherein the first intersection location corresponds to a first lighting result; and
launching a second ray in the plurality of rays from the second location inside the translucent object along the inverted normal vector in a second frame, wherein the second ray intersects the surface of the translucent object at a second intersection location, wherein the second intersection location corresponds to a second lighting result;
wherein aggregating the lighting results comprises aggregating the first lighting result and the second light result.

14. The computer-readable storage medium according to claim 8, wherein a distance value between the first location on the surface of the translucent object and the second location inside the translucent object along the inverted normal vector from which the plurality of rays is launched is configurable.

15. A device for rendering a translucent object in a scene, the device comprising:
a memory storing instructions; and
one or more processors configured to the execute the instructions to cause the device to:
select a first location on a surface of the translucent object;
generate an inverted normal vector from the first location on the surface of the translucent object;
identify a second location inside the translucent object along the inverted normal vector;
perform ray tracing by launching a plurality of rays from the second location inside the translucent object along the inverted normal vector;
determine for each ray of the plurality of rays, a lighting result from an intersection of the ray with a surface of the translucent object;
aggregate the lighting results corresponding to the plurality of rays into an aggregated lighting value; and
store the aggregated lighting value for the first location on the surface of the translucent object in a data structure, wherein the aggregated lighting value is configured to be applied to geometry corresponding to the translucent object to render the translucent object.

16. The device according to claim 15, wherein the data structure comprises a texture map that is configured to be applied to the geometry corresponding to the translucent object to render the translucent object.

17. The device according to claim 15, wherein aggregating the lighting results comprises:
applying a distance-based attenuation function to the lighting results corresponding to the plurality of rays, so that rays that interest the translucent object closer to the first location on the surface of the translucent object are given greater weighting.

18. The device according to claim 15, wherein the plurality of rays are launched in a spherical distribution from the second location inside the translucent object along the inverted normal vector.

19. The device according to claim 15, wherein performing the ray tracing comprises:
launching a first ray in the plurality of rays from the second location inside the translucent object along the inverted normal vector in a first frame, wherein the first ray intersects the surface of the translucent object at a first intersection location, wherein the first intersection location corresponds to a first lighting result; and launching a second ray in the plurality of rays from the second location inside the translucent object along the inverted normal vector in a second frame, wherein the second ray intersects the surface of the translucent object at a second intersection location, wherein the second intersection location corresponds to a second lighting result;

wherein aggregating the lighting results comprises aggregating the first lighting result and the second light result.

20. The device according to claim 15, wherein a distance value between the first location on the surface of the translucent object and the second location inside the translucent object along the inverted normal vector from which the plurality of rays is launched is configurable.

* * * * *